350-6.4 SR
XR 3,704,949
TX 3023E

United States Patent [15] 3,704,949
Thomas [45] Dec. 5, 1972

[54] METHOD AND APPARATUS FOR PERSONAL IDENTIFICATION

[72] Inventors: Carlton E. Thomas, Van Nuys, Calif.; Gary D. Cochran, Ann Arbor, Mich.

[73] Assignee: RMS Industries, Inc., Ann Arbor, Mich.

[22] Filed: June 22, 1970

[21] Appl. No.: 48,373

[52] U.S. Cl. ..........................356/71, 350/6, 350/285
[51] Int. Cl. ..............................................G06k 9/08
[58] Field of Search .........350/3.5, 6, 7, 162 SF, 285; 356/71

[56] References Cited

UNITED STATES PATENTS

| | | | |
|---|---|---|---|
| 1,689,847 | 10/1928 | Zworykin | 350/6 X |
| 3,083,611 | 4/1963 | Ziolkowski et al. | 350/6 X |
| 3,514,619 | 5/1970 | Ireland | 350/285 X |
| 3,532,426 | 10/1970 | Lemmond | 356/71 |
| 3,604,806 | 9/1971 | Redman | 356/71 |

FOREIGN PATENTS OR APPLICATIONS

| | | | |
|---|---|---|---|
| 1,188,302 | 4/1970 | Great Britain | 356/71 |

*Primary Examiner*—Ronald L. Wibert
*Assistant Examiner*—F. L. Evans
*Attorney*—Barnes, Kisselle, Raisch & Choate

[57] ABSTRACT

A method and apparatus for creating an encoded fingerprint card which consists of a hologram of a fingerprint created by a main illuminating beam and a reference beam on a sensitive photographic plate and the use of the encoded fingerprint in a matched filter correlator in real time wherein the fingerprint of a subject can be introduced into the system and correlated with the encoded information to verify identity between the original encoded information and the person claiming identity therewith. The system includes a means for creating relative motion between the fingerprint transform image and the transform plane filter in the form of a hologram to insure proper alignment at some place between said image and said filter to produce light output correlation peaks even when the image or the filter or both are mechanically misaligned.

9 Claims, 6 Drawing Figures

Figures 1, 1B, 2:
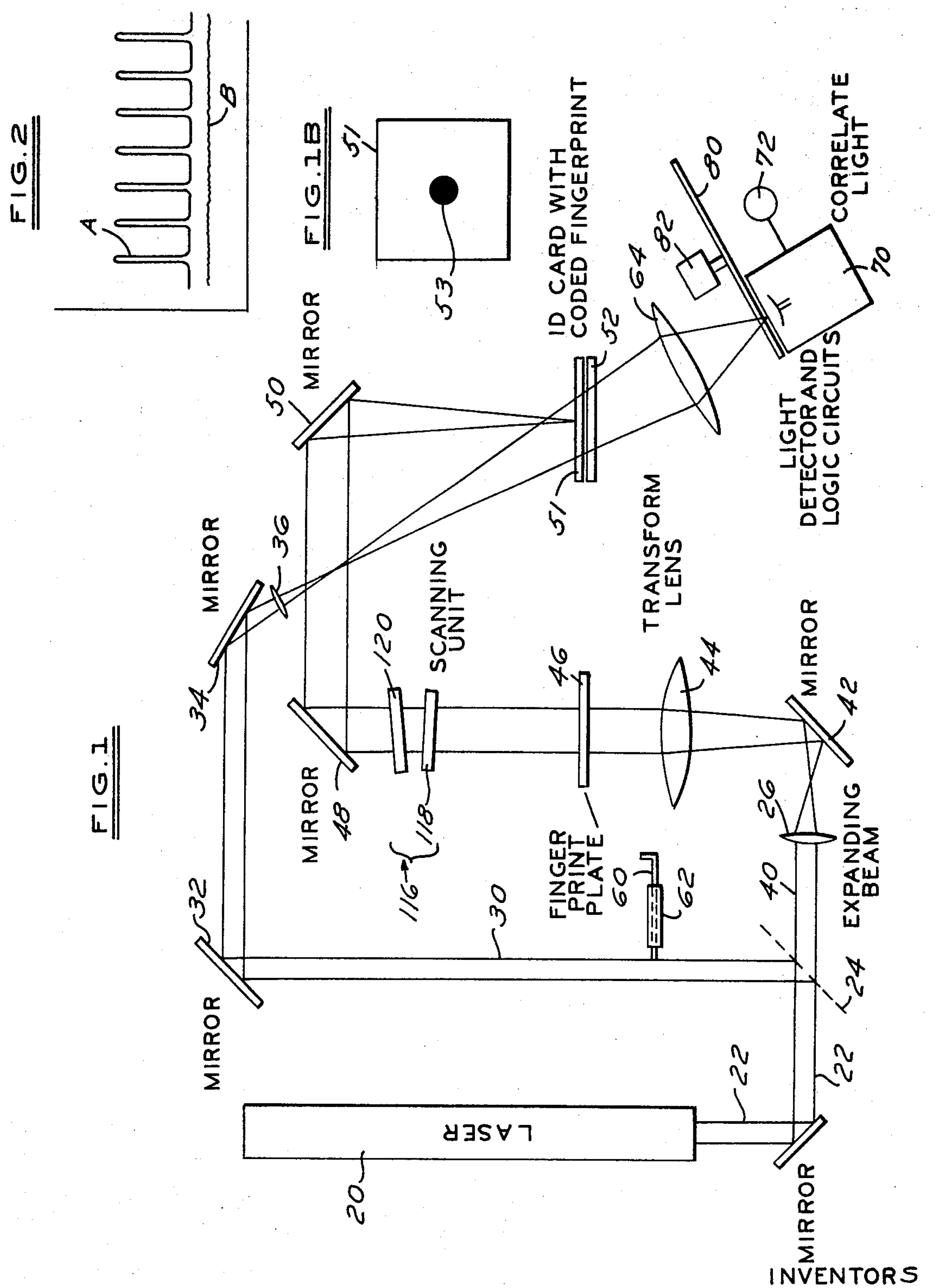

3704949
OR IN 356/71

INVENTORS
CARLTON E. THOMAS
GARY D. COCHRAN
BY
Barnes, Kisselle, Raisch & Choate
ATTORNEYS INVENTORS
CARLTON E. THOMAS
GARY D. COCHRAN
BY
Barnes, Kisselle, Raisch & Choate
ATTORNEYS

INVENTORS
CARLTON E. THOMAS
BY GARY D. COCHRAN

Barnes, Kisselle, Raisch & Choate
ATTORNEYS

METHOD AND APPARATUS FOR PERSONAL IDENTIFICATION

Reference is made to a co-pending application of Carlton E. Thomas on a "Method and Apparatus for Personal Identification," Ser. No. 774,674, filed Nov. 12, 1968, now abandoned.

This invention relates to a method and apparatus for personal identification and more particularly to improvements in the method and apparatus to insure proper alignment.

With the use of credit cards and charge plates and also with the necessity of identifying personnel for purposes of access to secured areas, it has become a problem to provide positive identification which will prevent impersonation and counterfeiting. Personal recognition, of course, is the ideal way of identification, but it is impossible except in a few instances to have this type of identification as a practical system.

With present day credit cards, it is possible not only to pass off a card which has been stolen but it is also possible to counterfeit the cards even when the cards are prepared with pictures and so on. This is a problem also with passports, identification cards, driver's licenses and the like. Stolen or counterfeit credit cards cause a loss of millions of dollars annually.

The problem then is to provide a positive system of identification which permits even strangers to identify a person as the proper holder of a card or a proper person to enter an area which has a limited access. Systems using photographs, signatures, fingerprints and mathematical coding can be defeated by counterfeiting which varies in the degree of difficulty but is generally possible.

It is an object of the present system to provide an identification method and an identification card which are essentially secure against impersonation or counterfeiting. The system includes the use of an identification card and also an apparatus which utilizes the card for positive identification but requires in connection with this identification the placing of the fingerprint of the person seeking to be identified at a specified place in the apparatus for a check-out which lends to positive identification. Thus, the system very definitely scrutinizes the fingerprint each time a person is checked and yet this is not simply a matter of comparing fingerprints but involves a matter of encoding the fingerprint information such that counterfeiting is practically impossible.

In brief, this system utilizes a specially prepared identification card which consists of encoded information optically obtained from the actual fingerprint of the subject. In the proper equipment, this encoded information can be checked with the actual fingerprint at a latter time utilizing a Fourier transform hologram and identification can be positively established. Thus, impersonation is virtually impossible due to the uniqueness of fingerprints, and counterfeiting is virtually impossible due to the complex form of encoding obtained by the optical system. In addition, the signals obtained by the encoded information and the actual fingerprint are treated optically to obtain a maximum signal to indicate a "go" or "no-go" condition.

The present invention relates to a means in the apparatus for creating a relative movement between the transform image created in real time and the transform plane filter to render less critical the positioning of the data which is to be correlated optically.

Other objects and features of the method, apparatus, and identification data will be apparent in the following description and claims wherein the principles of the invention and the operation are disclosed in connection with the best mode presently contemplated for the practice of the invention.

Drawings accompany the disclosure and the various views thereof may be briefly described as:

FIG. 1, a system for encoding fingerprint information and also for comparing an encoded plate with an actual fingerprint.

Figures 1A, 3:
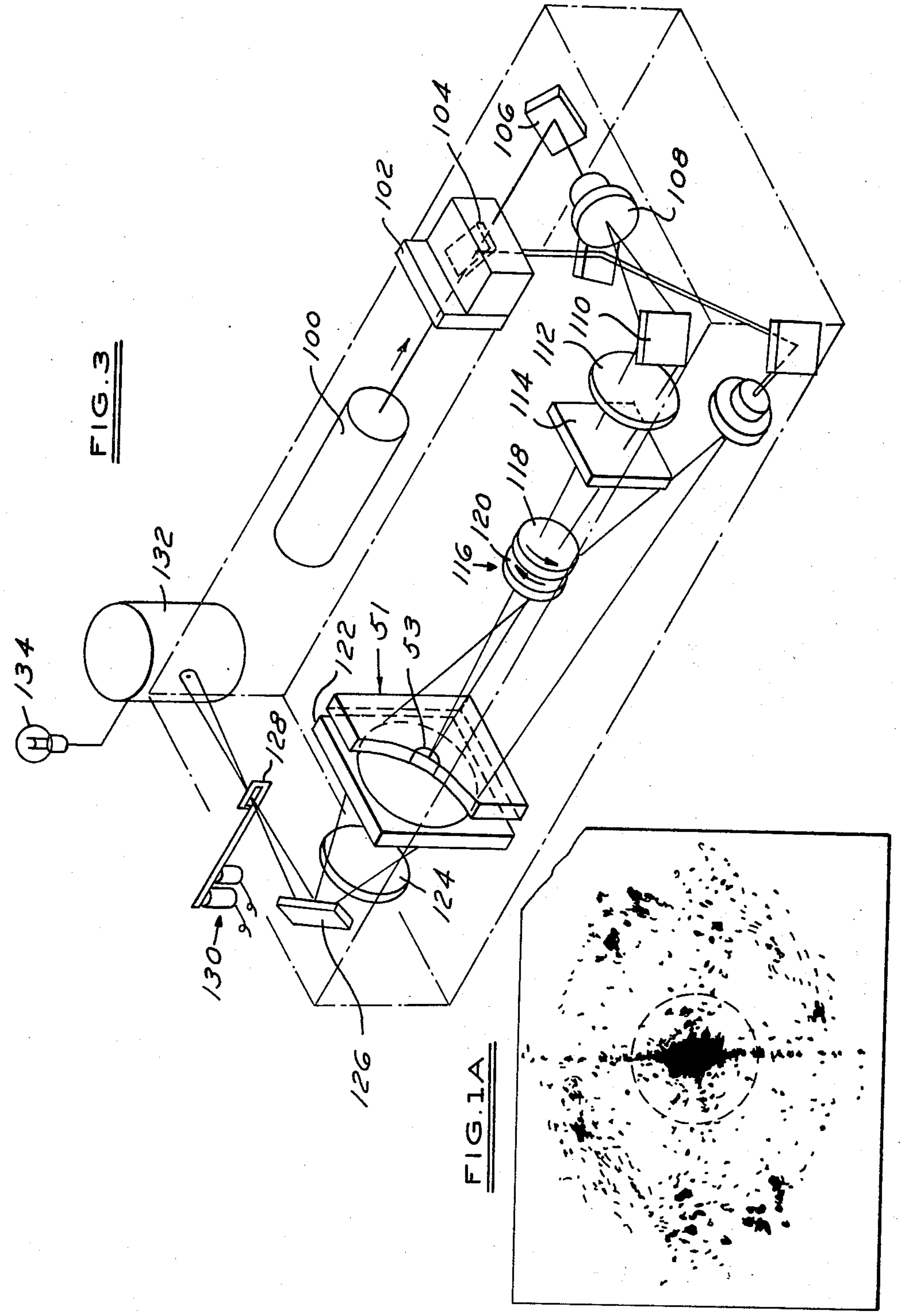

FIG. 1A, a view of a hologram of a particular fingerprint.

FIG. 1B, a view of a DC control plate.

FIG. 2, an illustration of a photodetected current in the system.

FIG. 3, a schematic view of the elements of an apparatus utilized in the system.

Figure 4:
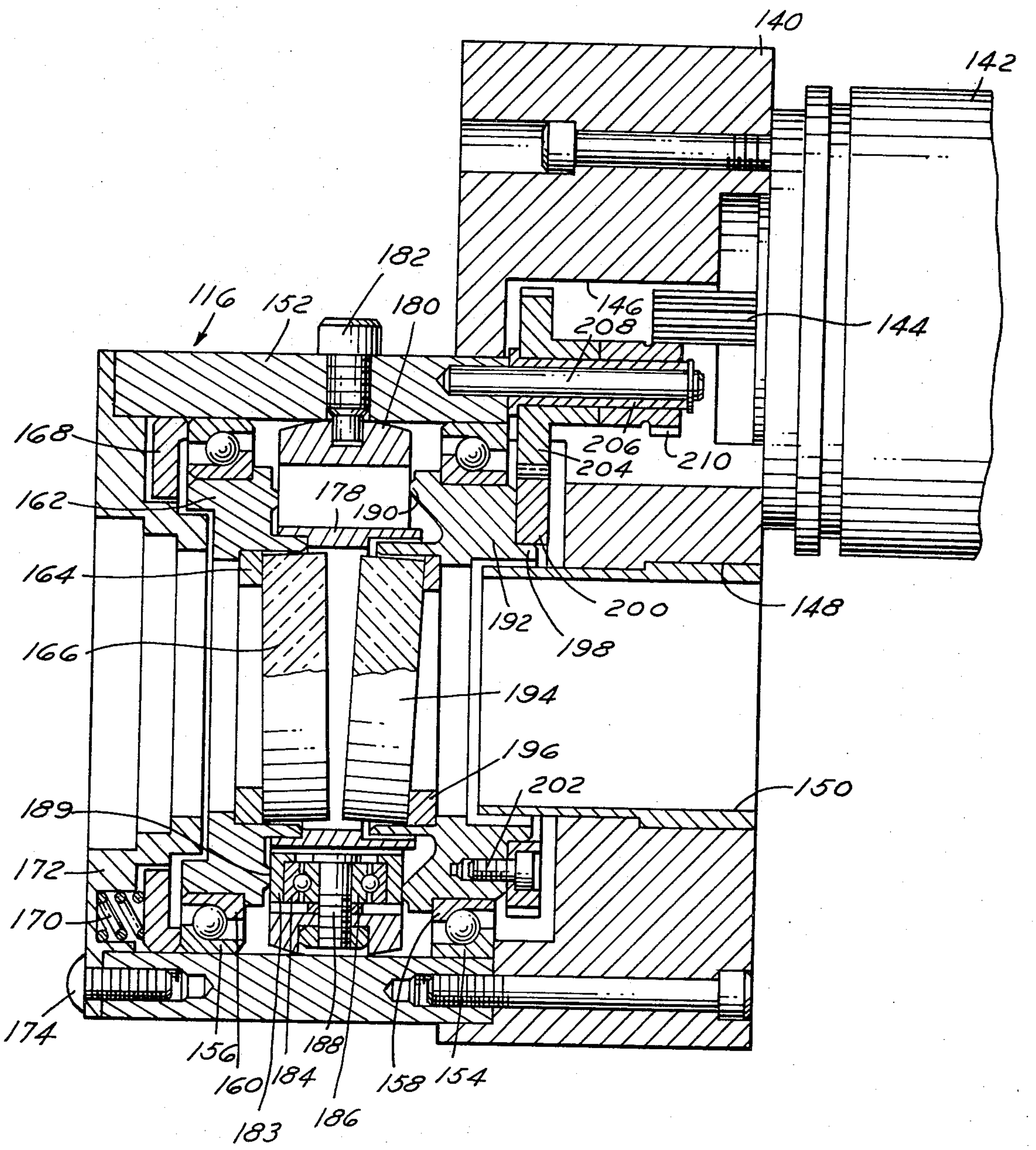

FIG. 4, a sectional view of a means for driving moving elements on the optical axis to accomplish relative motion between the transform image and the transform plane filter.

The present system is based on what is sometimes referred to as automatic correlation between a person's fingerprint and a specially encoded version of his fingerprint which is stored on an I.D. card or its equivalent. It is necessary to provide proper equipment which will compare the person's real time fingerprint with the impression of the coded fingerprint on his card. Thus, the system scrutinizes the fingerprint each time a person is checked.

In general, the system will involve the necessity of an investigative agency which will suitably identify a person prior to the encoding operation. After this is done, the encoding process is carried on. The investigative agency may be a bank, a police department, or a military agency for the respective purposes of credit cards, driver's licenses and security clearances. Once the person is identified, he moistens his finger with some oily or soapy substance such as castor oil or cosmetic soap and rolls a fingerprint on the input window of what might be termed a master correlator. The residue from this oily fingerprint is then used to generate a complex light pattern which technically is called a Fourier transform hologram, and this exposes a small piece of photographic film in an I.D. card.

The card is photographically developed, washed, and dried and the identified person is then free to leave the secured area. The apparatus to be used for this encoding will be described below. In connection with the system, there are two possible modes of operation; first, what might be referred to as an "open" system wherein the I.D. cards are carried by the person himself, or, second, what might be referred to as a "closed" system wherein the I.D. card is retained at the identification point and produced only for the purpose of comparison with the person seeking entrance. Since it is possible to control a number of parameters in the preparation of the encoded card, the closed system is essentially impervious to impersonation or counterfeiting and even the open system is essentially safe because of the practical impossibility of duplication of such parameters.

It will be understood that the basic function of the real read time" imprint, whether residue from finger ridges or an impression in a deformable substance, is to phase modulate the laser beam. This might be referred to as real time phase perturbation. Some of the parameters above referred to include the angle of the reference beam in two directions, the exact placement of the Fourier transform on the card in two dimensions, and the magnification of the transform data. There are thus many degrees of adjustment so that many different systems can be set up and an authenticated card in one system cannot operate the equipment in another similar but differently adjusted system.

In this specification and the claims appended, the term "coherent light" source shall be taken to mean a light source such as a laser beam or a monochromatic source resulting from a pin hole and collimator wherein the light waves emanating from a synchronized oscillation of electrons are of the same length and propagating in step.

Now with reference to FIG. 1, the apparatus involved utilizes a basic coherent light input in the form of a laser 20 which, through a mirror, directs a light beam 22 to a beam splitter 24 and also to a lens 26. The beam splitter carries a laser beam 30 up to a second mirror 32 and thence to a third mirror 34 where the beam is again passed through an expanding lens 36 as a reference beam for the holographic effect.

The beam 22 passing through the beam splitter 24 forms a beam 40 which passes through the expanding lens 26 to a mirror 42 and then to a transform lens 44 and through a transparent fingerprint plate 46 to reversing mirrors 48 and 50 and then to an exposure plane 52 which can be used not only to create the encoded information but also for comparison purposes. In creating the encoded information, a suitable I.D. card pack can be provided wherein a section of unexposed photographic film can be covered by a suitable light inhibiting sheet or tab which can be removed for purposes of exposure.

The sensitive film is placed at station 52 and when the subject's fingerprint has been placed on plate 46, an exposure is made with both the reference beam 30 and the main illuminating beam 40 which may be referred to as a spatial modulated light beam exposing the information being directed to the station 52. This will create a Fourier transform hologram of the fingerprint information on plate 46 and, as previously indicated, the parameters of this transform can be controlled by the various optical elements in the system which can be readily maintained as secret information. For example, the type of lens, the spacing of the optical elements, the degree of interference and so on can be controlled as secret information and reconstruction of these parameters from the resulting polographic information is extremely difficult.

In FIG. 1A, an enlarged view of a hologram of a single fingerprint is shown, the center area showing what is sometimes referred to as a D.C. spot and the peripheral areas carrying the significant data with respect to the particular print.

Once the encoded information is exposed on the sensitive plate at station 52, the plate may be developed for permanent recording of the information. It will be apparent that one or more fingers can be used but the system has been found satisfactorily accurate with a single print.

To establish identity, a person merely inserts his special I.D. card which has been prepared as above described into an appropriate correlator system as shown in the drawing and similar to that in which the encoding was accomplished. He rolls a fresh fingerprint (using a light oil such as castor oil) on the input window which is plate 46 (FIG. 1) and, under these circumstances, the reference beam is shut off by a slidable turn-off plate 60 suitably mounted on a base 62. The light passing through this fingerprint at plate 46 will be correlated with the I.D. card at station 52 and this light will pass through the lens 64 to a light detector and logic circuit system 70. Normally the light passing through the fresh fingerprint will automatically trigger the correlator light as soon as the finger is removed from the optical window 46. If, however, the fresh fingerprint is deposited with some rotation relative to its position during the encoded card generation process, then the operator can rotate the input window until correlation does occur which causes the illumination of a signal or correlate light 72. If the wrong fingerprint is deposited, of course, the correlator light 72 remains off. The correlation described is generally known as a matched filter correlator introduced by A. B. Vander Lugt of the University of Michigan and described in an article by Vander Lugt titled "Signal Detection by Complex Spatial Filtering," University of Michigan, IST Document No. 2900–394–72 November 1963.

The present system involves a variation on this matched filter correlator in the input mechanism as described and the output detection mechanism. The basic system described by Vander Lugt would require a person to make an inked fingerprint on transparent glass to utilize a photograph of an inked fingerprint. The nuisance of fingerprint ink and certainly the delay necessary to develop film each time an I.D. check was make would preclude the use of such a correlator.

The present system operates in real time directly on an oil residue from the finger which is easily wiped off the finger of the person seeking identification. Also in the output, previous matched filter correlators have utilized three types, namely, the output light distribution, which can be technically referred to as the two-dimensional correlation function, (1) viewed through a microscope, (2) photographed on film, or (3) displayed on a closed circuit TV system. All three techniques require a human operator to judge whether or not a correlation peak has occurred.

With the present system, this would require a semi-trained operator at each check point to interpret the light distribution at the output from the correlator. The present system automatically detects correlation peaks. This is accomplished by utilizing a rotating reticle 80 driven by a motor 82 to chop the light distribution from the station 52 before it reaches the light detector. This reticle 80 may consist of a series of radial transparent lines subscribed in an opaque background. As this motor driven reticle spins, it generates pulses of light if a correlation peak is present.

A light detector in the light detector system picks up these pulses as shown in FIG. 2. The line A showing the peaks occurs when there is proper correlation and the line B occurs when there is improper correlation. It would be possible, of course, to utilize another type of reticle such as a vibrator, i.e., a plate vibrating in its own place, rather than a rotating reticle. The reticle or vibrating slit reed is necessary to discriminate between light peaks and a general distributed light level. Thus, an incorrect fingerprint may produce as much total light energy (since all fingerprints have approximately the same frequency content), at the output of the correlator, but the correct fingerprint causes much of this light energy to be concentrated in one relative small spot called the correlation peak. Thus, a light detector by itself would not satisfactorily detect correlation peaks. The electrical waveform from the light detector is fed to a Schmidt trigger which turns on the correlate indicator lamp.

The holographic information in the present invention is being utilized "in reverse," it might be said, to recreate a reference beam. By way of explanation, a hologram is normally created using a "subject" or "illuminating" beam of coherent light and a reference beam from the same source. In the present instance a hologram of the original subject fingerprint is created in this way. Ordinarily then the hologram plate is used to regenerate the subject when it is illuminated with the reference beam. However, in the present instance it is not the purpose to recreate the subject fingerprint but rather it is the purpose to recreate the reference beam. Thus, in the correlation system the holographic record of the original identified print is illuminated with the subject beam as modified by the real time subject fingerprint. If the real time subject beam matches the original subject beam, the resulting output is the reference beam in such intensity as can readily be detected, as above described.

It will be appreciated that there are three basic units disclosed here. First, there is a camera for generating I.D. cards which includes elements such as the laser source 20, the input system including elements 26, 42, 44, 46, 48, 50 and 52, and the reference beam elements 24, 32, 34, 36. Secondly, there is a slave correlator which correlates fresh fingerprints with I.D. cards made in any camera or any master correlator within the same identification system. This correlator omits the elements 24, 30, 32, 34, 36, 60, 62 of FIG. 1. Finally, the entire system of FIG. 1, can be used to generate new I.D. cards and to correlate fresh fingerprints with previously prepared cards made on any camera or any other master correlator from the same system.

The camera could, of course, be used in the investigative agency where personal identification was established and where no correlation would be needed. The slave correlator would be used outside the secure environment to check personnel with little risk of counterfeiting since it cannot generate new cards. The device in the form of the correlator can also be used to activate a lock or an "on" switch so that the I.D. cards could be used by proper personnel to secure enclosures, computers, gas pumps, etc. No attendant would be necessary with this control system.

In FIG. 3, the elements of a working system for accomplishing the invention are illustrated in schematic form as they are arranged in an apparatus. The laser 100 directs an output beam to a shutter 102 and a beam splitter 104 which divides the laser output into two paths. One path moves to an angled mirror 106 and thence to a beam expander 108 and reflector 110 to a transform lens 112. The real time fingerprint input plate is disposed at 114 on the optical axis of the main beam and the optical light beam from the laser moving from this input plate 114 passes through a scanner 116 which, in the embodiment shown, is composed of two counter-rotating titled glass plates 118 and 120. The optical axis continues to the plate holder 122 which can be called a recording station as will be later described or an I.D. card holder when the system is used for checking identity.

An inverse transform lens 124 is positioned beyond the station 122 and the output beam is reflected at 126 to a scanning slit 128 which in this case is a vibrating slit which can be operated by a solenoid coil 130 of the type commonly used for a door bell ringer and the like. This vibrating slit has a motion in the neighborhood of 120 vibrations per second and preferably higher than this. The ultimate output is directed to a light detector 132 which is in the form of a photomultiplier or a solid state light detector and can be used in connection with a Schmidt trigger to turn on a correlate light signal 134.

In the system shown in FIG. 1, the scanner elements 118, 120 are shown between the fingerprint input plate 46 and the corner mirror 48.

It has been found that while the exact position of the real time fingerprint on the plate 46, for example, of FIG. 1 and the plate 114 of FIG. 3 is not critical, nevertheless, the I.D. card, that is, the recorded hologram of the original fingerprint input, developed from a photosensitive plate, must be relocated in the system to within fractions of a milli-inch each time an identification is made. This repositioning tolerance is extremely difficult in view of varying temperatures of the cards, possible edge wear, and the possibility of the developed film within the card shifting within the frame work furnished by the card.

Another variable is the normal positional tolerance from one correlator to another in a given system. The basic concept of introduction of the scanner 116 in the system is to move the light distribution at the transform (I.D. card) plane over a limited two-dimensional range so that, at some instant of time, the Fourier transform is brought into the correct position relative to the I.D. card. At this moment of registration, an autocorrelation peak will be detected, assuming that the fingerprints match so that an adequate light transfer is obtained to trigger the light detector.

As long as the time to scan the transform plane image over all reasonable I.D. card positions is relatively short, that is, on the order of several seconds, the scanning operation is acceptable. The scanner is preferably a pair of counter-rotating glass elements such as prisms or tilted plates and in either case one element should rotate at a different speed than the other. The two elements are placed in the optical path in front of the Fourier transform plane and, in the case of flat plates, each is tilted to deflect the transform plane laterally. Various rosette type scan patterns can be achieved by varying the two tilt angles and the ratio of the two element rotation rates. The use of this system has eliminated difficulties due to misalignment and permitted consistent results and reliability in the fingerprint correlator.

In FIG. 4, an actual apparatus is disclosed for the scanner 116. In this apparatus a mounting body 140 has mounted thereon a motor housing 142, the motor having a small toothed drive shaft 144 extending into a gear recess 146. This housing 140 also has an optical recess 148 in which is mounted a tube 150 extending in the direction of the optical axis of the system. Mounted on the body 140 is a secondary housing 152 in the form of a tubular member which extends outwardly from the body to form a recess for the rotating optical units.

At each end of this cylindrical housing 152 are stationary bearing races 154 and 156 which respectively carry an inner rotating race 158 and 160. The left-hand bearing race 160 carries a lens holder 162 which has an inner concentric opening to receive a wedge ring 164 against which is mounted one of the rotating plates 166. If a prism is used, the wedge ring could be eliminated. Epoxy glue can be used to mount the glass parts. A circular ring 168 is urged against the bearing race 156 by a plurality of compression springs 170 seated in suitable recesses in a retainer ring 172, this ring having a suitable central opening to permit the passage of light along the optical axis. A plurality of screws 174 hold the retainer ring 172 in place against the left-hand end of the housing 152. The lens mount ring 162 has an extending circular flange 176 which has a suitable engagement with an inner portion 178 which is part of a ring mounted 180 within the housing 152 and held from rotation by a screw 182.

Circumferential openings around the ring 180 carry idler friction rollers 183 which are mounted on the outer race 184 of small ball bearing units having an inner race 186 held in place by a headed screw 188. These small idler gears 183 engage an annular surface 189 on ring 162 on the one side and an annular surface 190 on the inner surface of a glass carrying ring 192. A glass plate 194 is carried in this ring 192 backed against a wedge ring 196. On a short flange 198 on ring 192 is mounted a ring gear 200 which engages with a drive gear 204 supported on a cantilever mounted bearing sleeve 206 held in place by a screw pin 208. Also on the bearing sleeve 206 is a gear 210 which is driven by the toothed drive shaft 144 of motor 142. It should be noted that the annular surface 189 has a smaller radius than the surface 190 to give a different speed ratio to rings 162 and 192.

It will thus be seen that when the motor 142 is operating, it will drive, through gears 210 and 204, to the ring gear 200 which drives the glass mounting ring 192 in one direction of rotation. At the same time, the friction surface 190 is driving the idler rollers 183. These idler rollers, engaging surface 189, rotate the ring mount 162 in a direction opposite to that of the ring mount 192 and at a different speed. Thus, light passing through the optical axis into the opening in sleeve 150 will be nutated at an equal tilt in different directions by the two glass elements 166 and 194.

It is important that the scanner slit 128 be operated at a frequency much greater than the frequency of rotation of the scanner such that the vibrating reed will pass through the center of the optical axis once during each shift of the transform image by more than one resolution element. Thus, a fingerprint which is impressed on the fingerprint plate 114 will create a Fourier transform in the optical system which will be compared in an optical correlation procedure with a similar recorded transform at the station 122, and the effect of the scanner 116 will permit suitable opportunity for the matching of these inputs providing they are derived from an identical source finger. The effect of the rotation is a scanning of the recorded data and an oscillation in the transform plane until alignment is achieved. Thus, if the input and recorded data do have identity, there will be ample opportunity for the correlation to occur and the proper read-out to be effected.

In a conventional correlator, there is a certain amount of light in lower frequencies which shows up in a Fourier transform as a spot about at the center of the transform. See FIG. 1A. This is sometimes referred to as the D.C. (Direct Current) light, having reference to the low frequency. In connection with the use of holograms, the D.C. spot on the Fourier hologram normally blocks the correlator D.C. light beam. But in the present disclosure the utilization of a scanner mechanism may cause the strong D.C. light beam to miss the D.C. spot on the hologram and some of this light energy may be diffracted by the low spatial frequencies of the hologram into the output correlation plane. This would interfere with the correlation and prevent the occurrence of a dominant light spot. In fact, due to the extreme brightness of the D.C. beam, the random fluctuations in the spatial light distribution may create spikes of amplitude comparable to correlation spikes. Thus, false correlation signals might frequently occur.

To prevent these false correlations generated by the above described D.C. light beam, it is proposed to introduce a D.C. block large enough to stop the D.C. light beam over the complete range of scanner positions. This may take out some low spatial frequency information but correlations are generally sensitive only to high spatial frequencies. This is the case for fingerprint correlations and the artificial block can be many times larger than the focused D.C. light spot.

This is accomplished by placing an opaque spot on a glass plate in the transform plane. In FIG. 1, this plate is shown at 51 and in FIG. 1B the plate 51 is shown with a spot 53. The size of this spot may vary but with the average system which uses a hologram with a total overall dimension of 3.2 mm the spot can be about 0.4 mm in diameter. With reference to FIG. 1A, which is an enlarged hologram of a fingerprint, the spot can be about the size of the dotted circle at the center. The I.D. card hologram will be centered on this window or plate 52.

An alternative approach is to expose each I.D. card hologram to a pinhole, either before or after exposing the light sensitive film to capture the hologram. Prior to development, the I.D. card is inserted into a fixture identical to a proper holder on the correlator, see 122 in FIG. 3. It is pin registered so that a pinhole is nominally centered over the D.C. spot of the hologram area. A light source is turned on to illuminate the pinhole and double expose the D.C. block onto the holographic latent image. Then the hologram is developed in the conventional manner. In this system, each I.D. card carries its own D.C. block.

We claim:

1. An apparatus for providing security and identification which utilizes a recorded hologram of personal data and correlates said data optically in a complex filter correlation with a transform of real time data input comprising:

a. a source of coherent light to provide an illuminating beam and a transform lens in said beam to create a transform plane, b. first means in said illuminating beam responsive to the surface impression of a finger to display a fingerprint to alter the beam in a phase modulation with the data of said print, c. second means spaced from said source and said first means and in the path of said beam for supporting a pre-recorded hologram of a fingerprint of an individual to serve as a filter in the transform plane of the system, d. light responsive means positioned to receive the phase modulated beam as altered by said data and said pre-recorded hologram at a correlation output plane to respond to the light output of the optical matching of said filters to indicate the existence of matching or non-matching, e. a correlation indicator responsive to a predetermined light output at said light responsive means to register correlation matching, f. a plurality of optical elements mounted in said beam between said first means and said second means, each of said elements serving to direct the optical path at an oblique angle to the path of said beam, and g. means to move said elements in opposite directions at different speeds to cause the data input to scan a prescribed area of recorded data on the optical axis at the transform plane to insure momentary alignment registration for light transmission when said data is matching.

2. An apparatus as defined in claim 1 in which means is interposed in said beam adjacent the transform plane to block out the sweep of D.C. light adjacent the center of the optical path to prevent false signals reaching said light responsive means.

3. An apparatus as defined in claim 2 in which said optical elements are disposed relative to said beam to provide a resultant sweep angle of deviation of said beam which confines the D.C. light of the beam to the area of the D.C. block.

4. An apparatus as defined in claim 1 in which a light mask having one or more light slits therein is mounted in said beam at the correlation output plane, means to move said slits across said beam in repetitive motion to develop a series of light peaks when correlation occurs, said last means being operated at a frequency greater than the frequency of motion of said optical elements.

5. An apparatus as defined in claim 1 in which said optical elements comprises refractive plates mounted at different angles relative to the path of said beam, and the means to move said elements comprise:

a. a first mounting ring surrounding one optical element and provided with an annular face to be driven and a first annular drive surface on a plane normal to the axis of said ring, b. a second mounting ring surrounding a second optical element provided with a second annular surface to be driven and lying in a plane normal to the axis of said ring, c. means to mount said rings for rotation on an axis parallel to and substantially coincident with the path of said beam, said first and second surfaces having different radial dimensions, and d. drive rollers lying between said drive surfaces rotatable on axes radial to said rings and having annular surfaces with radial dimension to contact each of said first and second drive surfaces wherein rotation of said first mounting ring in one direction will effect an opposite rotation of said second mounting ring at a different speed.

6. An apparatus for providing security and identification which utilizes a recorded hologram of personal data and correlates said data optically in a complex filter correlation with a transform of real time data input comprising:

a. a complex filter correlation system utilizing a coherent light beam, a transform lens to establish a transform plane in said beam, means to support data in said beam at a selected input plane, and means including a reconstruction lens to establish a correlation output plane, b. means forming a transparent surface on said data supporting means at said input plane for registering the fingerprint of a person to be identified and forming a Fourier transform thereof, c. a formed hologram of a fingerprint of a person to be identified at the transform plane, d. an indicator means at the correlation output plane responsive to reconstruction of a correlated reference beam for indicating correlation of the input print and the formed hologram print, and e. means between said input plane and said transform plane movable to sweep said Fourier transform over said formed hologram to obtain momentary alignment registration to permit reference beam reconstruction when said transform and formed hologram are identical.

7. An apparatus as defined in claim 6 in which a D.C. mask is provided at the transform plane to block the sweep of D.C. light in said correlation system from said indicator means.

8. A method of providing a personal security and identification system in a complex filter correlation which comprises:

a. taking an impression of a fingerprint of an individual in translucent oil on a transparent surface, b. placing said impression in a beam of coherent light to form a Fourier transform, c. placing a formed hologram of a fingerprint of a person to be identified at a transform plane in said beam downstream from said fingerprint impression, d. rotating a plurality of refractive elements in said beam between said impression and said formed hologram at different speeds and differing refractive angles to cause a sweeping of the Fourier transform formed by said impression on said formed hologram to facilitate momentary alignment, e. moving a light mask having one or more light slits across said beam at a correlation output plane to interrupt said beam at a frequency greater than the frequency of rotation of the refractive elements, and f. determining correlation and identity with an indicator device responsive to light peaks resulting from correspondence of the transform of the impressed fingerprint and the formed hologram.

9. A method as defined in claim 8 which includes a. placing an opaque disc at the center of said beam at the transform plane to block the moving beam of D.C. light from the correlation output.

* * * * *

PO-1050
(5/69)

UNITED STATES PATENT OFFICE
CERTIFICATE OF CORRECTION

Patent No. 3,704,949 Dated December 5, 1972

Inventor(s) Carlton E. Thomas and Gary D. Cochran

It is certified that error appears in the above-identified patent and that said Letters Patent are hereby corrected as shown below:

Please change the name of the assignee corporation from "RMS Industries, Inc." to -- KMS Industries, Inc. --

Signed and sealed this 1st day of May 1973.

(SEAL)
Attest:

EDWARD M. FLETCHER, JR.
Attesting Officer

ROBERT GOTTSCHALK
Commissioner of Patents